United States Patent [19]
Barry et al.

[11] Patent Number: 5,410,332
[45] Date of Patent: Apr. 25, 1995

[54] TRACKBALL DEVICE WITH IMPROVED BALL SUSPENSION AND ADJUSTABLE RESOLUTION

[75] Inventors: Timothy C. Barry, Fremont; John K. Martinelli, Paso Robles; Charles E. Ader, Concord, all of Calif.

[73] Assignee: Microspeed, Inc., Fremont, Calif.

[21] Appl. No.: 771,066

[22] Filed: Oct. 2, 1991

[51] Int. Cl.[6] .............................................. G09G 1/16
[52] U.S. Cl. ..................................... 345/164; 345/156
[58] Field of Search ....................... 340/706, 709, 710; 74/471 XY; 250/221, 231.14; 248/918; 108/143; 345/163–167, 184, 156

[56] References Cited

U.S. PATENT DOCUMENTS

| Re. 32,633 | 3/1988 | Hovey et al. | 340/710 |
|---|---|---|---|
| 4,375,592 | 3/1983 | Cox et al. | 250/231.14 |
| 4,538,476 | 9/1985 | Luque | 340/710 |
| 4,562,347 | 12/1985 | Hovey et al. | 340/710 |
| 4,575,086 | 3/1986 | Kim et al. | 74/471 XY |
| 4,786,892 | 11/1988 | Kubo et al. | 340/710 |
| 4,801,931 | 1/1989 | Schmidt | 340/710 |
| 4,933,670 | 6/1990 | Wislocki | 340/709 |
| 4,951,034 | 8/1990 | Mazzone et al. | 74/471 XY |
| 4,952,919 | 8/1990 | Nippoldt | 273/148 B |
| 4,963,858 | 10/1990 | Chien | 340/710 |

Primary Examiner—Alvin E. Oberley
Assistant Examiner—Steven J. Saras

[57] ABSTRACT

A trackball device for controlling a cursor on a display screen employs two rotatable shafts and a single nonrotatable support member in contract with the ball to convert rolling motion of the ball to X and Y positioning information. The nonrotatable support member has a number of spaced bearing surfaces and may be removed from and replaced in the trackball housing to present a different bearing surface to the ball, thereby prolonging the life of the device. The device may be provided with removable apertured phase slit members which can be replaced with phase slit members having different apertures therein, to modify the operating resolution of the device.

3 Claims, 4 Drawing Sheets

TRACKBALL DEVICE WITH IMPROVED BALL SUSPENSION AND ADJUSTABLE RESOLUTION

BACKGROUND OF THE INVENTION

1. Field of the Invention

This invention relates in general to devices for controlling a cursor on a display screen, and relates more particularly to such devices having a simplified construction and improved resolution.

2. Description of the Prior Art

A control ball device, commonly known as a "trackball", is often used with a computer to control the motion and position of a cursor on a video terminal screen. In typical applications, the cursor is moved to a desired location on the screen through movement of a roller ball by the user, and a specific function is then selected by pressing one or more keys on the control device.

A trackball device is described, for example, in U.S. Pat. No. 4,575,086, which shows a user-operated roller ball supported on three rollers, with two of the rollers mounted at right angles to each other and having encoding disks on their shafts. The encoding disks are provided with apertures which cooperate with a light emitting diode and a photodetector to provide a series of pulses as the rollers rotate. The control ball can be moved in both coordinate directions, with one of the encoding disks recording the motion of the ball in each of the coordinate directions. Hence, the cursor can be moved both up or down and to right or left on the display screen. The total device (control ball, rollers, encoding disks and electronics) is enclosed in a housing, the top side of which has a circular opening through which a part of the control ball protrudes. The operator can manipulate the control ball by placing his fingers on the protruding part of the ball.

U.S. Pat. No. 4,801,931 discloses a trackball device employing a pair of orthogonally displaced concave roller members which have the shape of truncated double cones and which carry encoding disks. These roller members engage the control ball and rotate in response to movement of the control ball to provide an indication of the control ball movement in the X and Y directions. Support for the roller ball in the housing is provided by one or two additional rotatable roller members which engage the roller ball at a point or points spaced from the roller members which provide the X and Y position information.

SUMMARY OF THE INVENTION

In accordance with the present invention, a trackball device is provided with two rotatable roller members and a non-rotatable support member for the roller ball in the trackball housing. This structure eliminates the need for a rotatable or otherwise movable support member, thereby simplifying the structure and reducing its cost. In a preferred embodiment of the invention, this support member is formed with four spaced bearing surfaces, and the position of the support member in the housing can be changed by a user to successively expose a different support surface to the roller ball. Thus, if one bearing surface of the support member becomes worn after extended use, the position of the support member in the housing may be changed to expose a new bearing surface to the roller ball. This results in continued optimum trackball rolling characteristics and extended operating life for the trackball device.

Additionally, the support member of this invention is located in a plane above that of the common plane through the axes of the rotatable roller members. This structure results in greater stability of the ball member in the trackball housing, in contrast to prior art trackball devices in which the rotatable encoding roller member are located in the same plane as the rotatable idler support roller member.

Another significant feature of the present invention is the use of phase slits which are removable from and replaceable in the trackball housing. Some photo-optical trackball devices have phase slits which are optical slits disposed in the light paths from the encoder disks to control the resolution of the device. In prior art trackball devices, these phase slits were an integral part of the housing, so that if it was desired to change the resolution on either or both of the axes of the device, it was necessary to re-tool the entire sensor housing and the encoder disk or disks, which represents a major expense. In accordance with this invention, the phase slit portions of the device are replaceable in the sensor housing, so that by removing one or both of the existing phase slit members and encoding wheels, and substituting one or both new phase slit members and encoding wheels, the desired new resolution can be obtained at a relatively modest cost. This feature adds to the flexibility of the resulting trackball device and makes it more easily adapted to a wide variety of applications which require different resolutions.

DESCRIPTION OF THE PREFERRED EMBODIMENT

Figure 1:
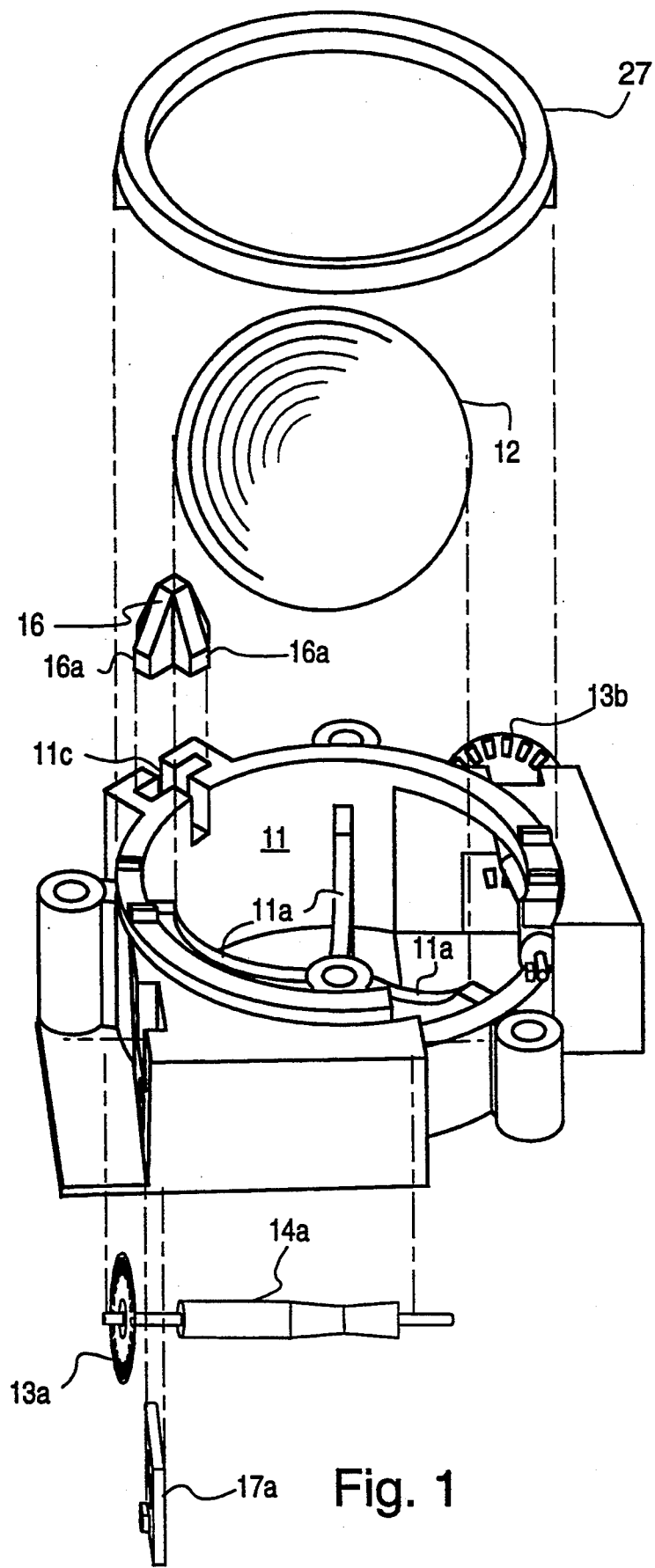
FIG. 1 is an exploded perspective view of the trackball and trackball housing.

In FIG. 1, the trackball housing 11 include a concave interior opening in which a roller ball 12 is mounted. Ball 12 is preferably formed of Valox, a high density plastic material manufactured by General Electric Co. This high density assists in maintaining ball 12 in solid contact with the roller members and the support member. The interior of housing 11 includes three raised ribs 11a which support ball 12. Rolling motion of ball 12 by a user is detected by movement imparted by the ball to a pair of encoder members. In FIG. 1, these encoder members include a pair of encoder disks 13a, 13b which have spaced apertures therein and which are disposed at right angles to each other. Disks 13a, 13b are mounted on shafts which are rotated by movement of roller ball 12. In a preferred form of the invention, these shafts are in the form of members 14a, 14b (FIG. 2) mounted in a common plane, each of which has a section in the shape of a truncated double cone. Each shaft 14a, 14b provides contact with roller ball 12 at two points to provide rotation of the shafts and their associated encoder disks 13a, 13b in response to motion of ball 12. Shafts 14a, 14b are suitably journalled in housing 11 so as to be able to rotate freely while being retained in position in the housing.

Figure 5:
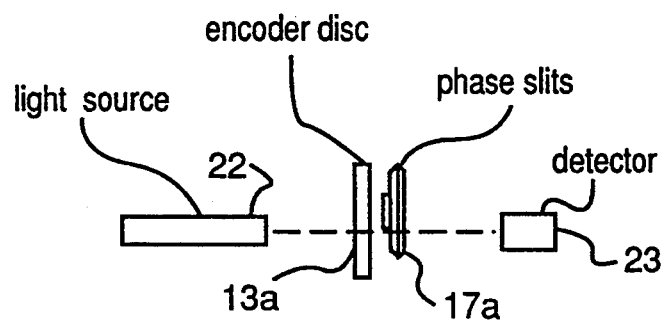
FIG. 5 is a diagram of the optics of an encoder disk/phase slit type of motion detector used in the invention.

Encoder disks 13a, 13b may be part of a well known optical encoding system used in hand operated cursor control devices and as such form no part of the present invention. In general, movement of ball 12 results in rotation of one or both shafts 14a, 14b and encoder disks 13a, 13b. As shown diagrammatically in FIG. 5, rotation of the apertures in disk 13a modulates a light beam passing therethrough and through a phase slit member 17a from a light source 22. The relationship between the size of the apertures in disk 13a and those in phase slit member 17a determine the resolution of the trackball device. This light modulation is detected by circuitry 23 to provide signals which are indicative of the direction and velocity of the motion in one direction imparted to ball 12 by the user. A similar arrangement for detection of motion in the orthogonal direction is provided for encoder disk 13b and a phase slit 17b (not shown in FIG. 5). These motion signals are then utilized to control the motion of a cursor on a display screen.

An important feature of this invention is the use of a roller ball support member which does not rotate during operation of the trackball device, thereby simplifying its construction. Further, the position of the support member in the housing can be changed by a user to present a new support surface to the ball member if the existing surface becomes worn. This support member 16 is shown in FIG. 1 and is adapted to be inserted in a cross-shaped notch 11c in housing 11. Member 16 has four spaced projecting surfaces 16a, one of which, when properly positioned in notch 11c, forms a support surface for roller ball 12, as will be described below in connection with FIG. 2.

When member 16 is inserted in notch 11c, it is frictionally engaged therein so as to be retained firmly in position in the notch during use of the trackball device, but is sufficiently free so that it can be removed from the notch by a user who can then insert it in the notch with a different, unworn support surface 16a facing ball 12. This structure provides the availability of four different support surfaces in the device, thereby prolonging the life of the device, while eliminating the need for a support member which must rotate or otherwise move during operation of the device. Support member 16, as well as housing 11, is preferably formed of Delrin material for its lubricating and durability characteristics.

Figure 7:
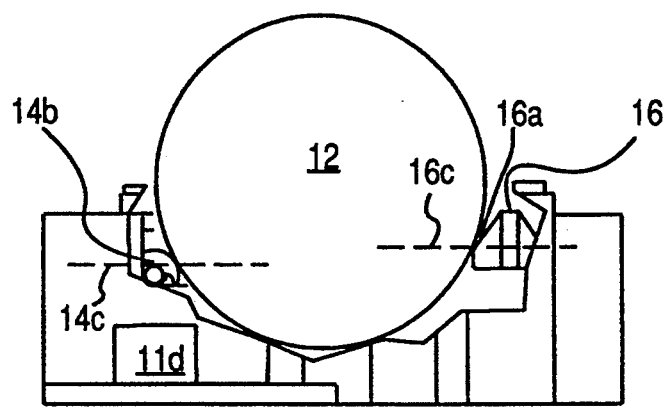
FIG. 7 is a side view, partially cut away, showing the location of the plane of the non-rotatable support member relative to the common plane of the rotatable roller members.

Roller ball 12 engages shafts 14a, 14b at two points on each of the shafts, while one of the projections 16a on member 16 provides a bearing support surface for the ball. From FIG. 7, it can be seen that the bearing support surface provided by a projection 16a is located in a plane 16c above the common plane 14c of the axes of roller members 13a, 13b, thereby increasing the stability of the structure.

Not all trackball devices employ phase slit members. However, for those that do, the replacement phase slit members of this invention provide a means to vary the resolution of the device without a major reworking of the trackball housing.

Figure 2:
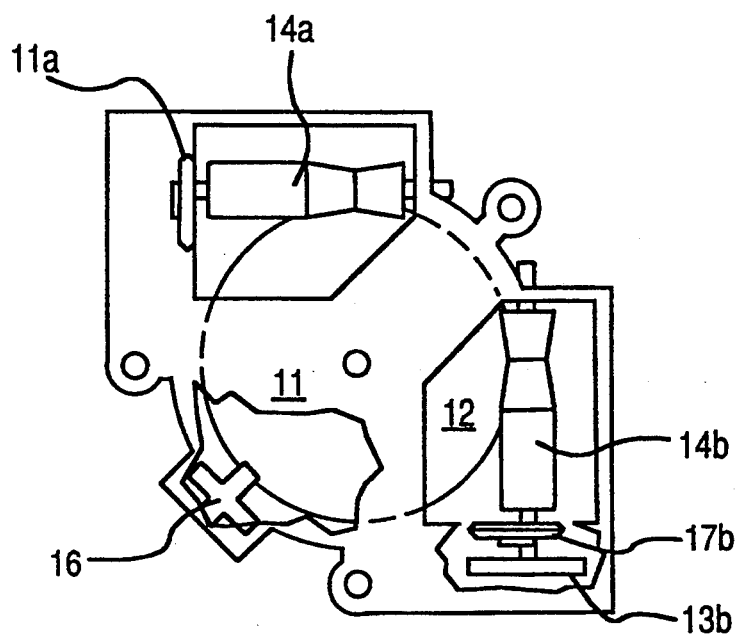
FIG. 2 is a bottom view, partly in cross section, of the trackball structure shown in FIG. 1.
Figure 3:
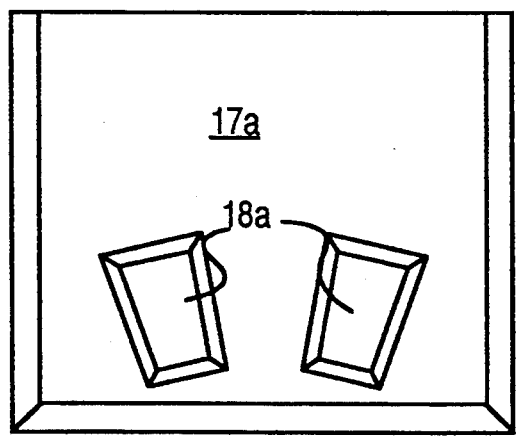
FIGS. 3 and 4 are side and top views, respectively, of a phase slit member in accordance with this invention.
Figure 4:
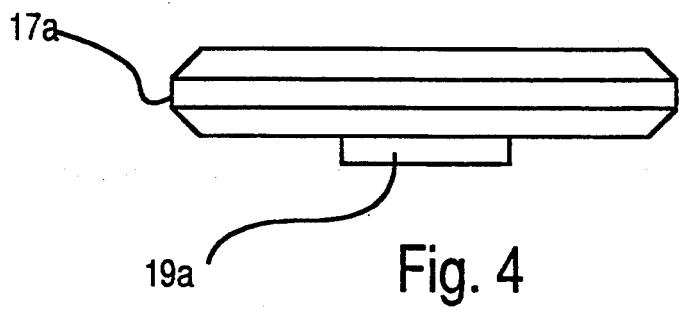
Figure 6:
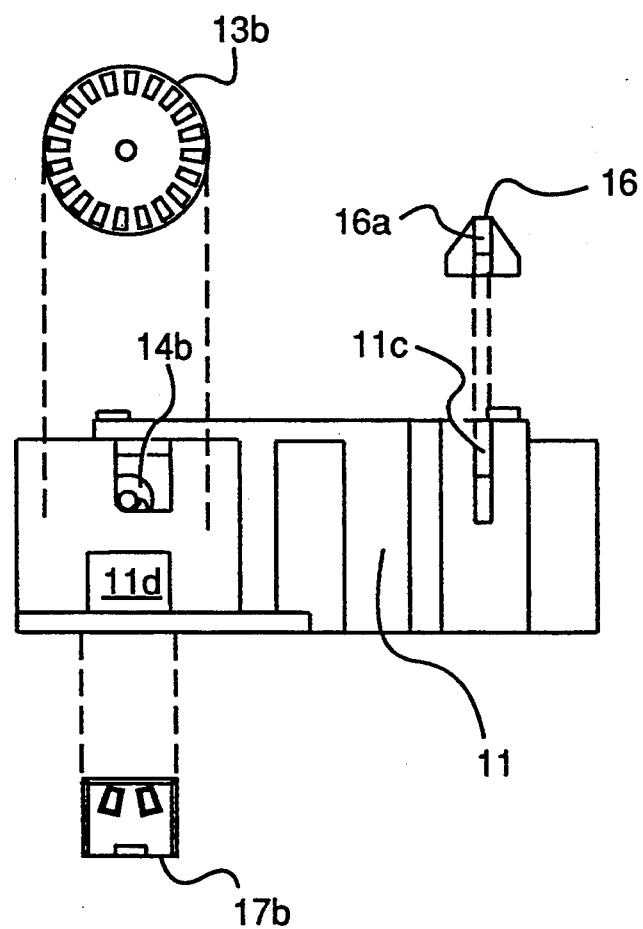
FIG. 6 is an exploded view of a portion of the housing structure showing one encoder disk, one phase slit member and the nonrotatable support member.

Referring to FIG. 3 and 4, one of the replaceable phase slit members of the invention is illustrated. This is in the form of a generally rectangular member 17a having a pair of apertures 18a therein. One surface of member 17a has a raised portion 19a which engages a notch in the bottom of housing 11 to position member 17 in the housing. As seen in FIG. 2, member 17b is shown in the inserted position in notch 11d in the housing. FIG. 6 shows the manner in which slit member 17b is inserted in its associated notch 11d. When inserted in their respective notches 11d, the raised portions 19 serve to retain members 17a, 17b in position, while permitting their removal by a user for replacement with phase slit members having different aperture sizes to change the resolution of the trackball device. When in position, the phase slit members are aligned in the optical paths with their associated encoder disk 13a, 13b, in the manner shown in FIG. 5.

Figure 8:
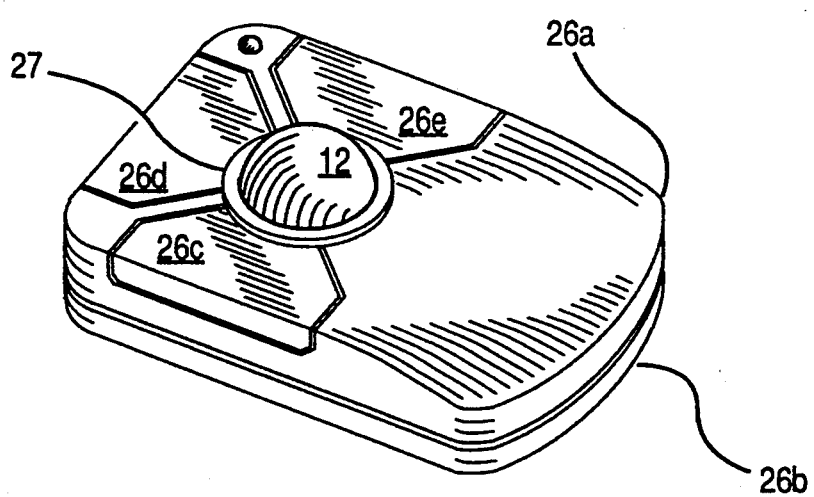
FIG. 8 is a perspective view of an assembled trackball device embodying the present invention.

As shown in FIG. 8, the trackball mechanism of this invention may be mounted in a housing including a cover 26a and a base 26b. An O ring member 27 (FIGS. 1 and 8) is preferably provided in a position to be compressed against ball member 12 when cover 26a is assembled to base 26b. This prevents inadvertent movement of ball member 12 when it is not actuated by a user. Cover 26a may be provided with different button sections 26c, 26d and 26e, each of which is operable by the user to transmit different commands to the using system. To replace phase slit member 17a, 17b or to change the position of the bearing surface of support member 16, cover 26a may be removed to provide ready access to these elements.

I claim:

1. A device for controlling a cursor on a display screen comprising:
   a housing member;
   a roller ball in said housing member movable by a user;
   a pair of rotatable roller members disposed in said housing member and engaging said roller ball, said roller members being rotatable in response to movement of said ball;
   a non-rotatable support member in said housing member and engaging said roller ball in an area of said ball spaced from the areas of engagement of said ball by said rotatable roller members;
   means responsive to rotation of said roller members by said roller ball for producing signals for controlling the motion of said cursor;
   said non-rotatable support member being removable from said housing member; and
   said non-rotatable support member having a plurality of spaced support surfaces, any one of which may be positioned to engage said ball member, whereby said support member may be removed from said housing member and replaced therein to present a different one of said support surfaces for engaging said ball member.

2. A device in accordance with claim 1, including:
   motion sensing means in said housing member for converting movement of said roller ball by said user into signals indicative of the amount and direction of said movement, said motion sensing means including first optical encoding means and second encoding means each including an optical path;
   means for varying the optical characteristics of at least one of said optical paths to vary the resolution of said device, including
   a light source;
   a light detector;

an encoding disk disposed between said light source and said light detector and having a plurality of spaced apertures therein, each said encoding disk being rotatable in response to movement of said roller ball;

a phase slit member disposed between said light source and said light detector and having apertures therein, said apertures in said phase slit member being aligned with said apertures in said encoding disk;

at least one of said phase slit members being removable from and replaceable in said housing member.

3. A device in accordance with claim 2 in which both of said phase slit members are removable from and replaceable in said housing member.

* * * * *